No. 696,460. Patented Apr. 1, 1902.
W. MALONEY.
GRAIN THRESHING MECHANISM.
(Application filed Apr. 15, 1901.)
(No Model.) 4 Sheets—Sheet 1.
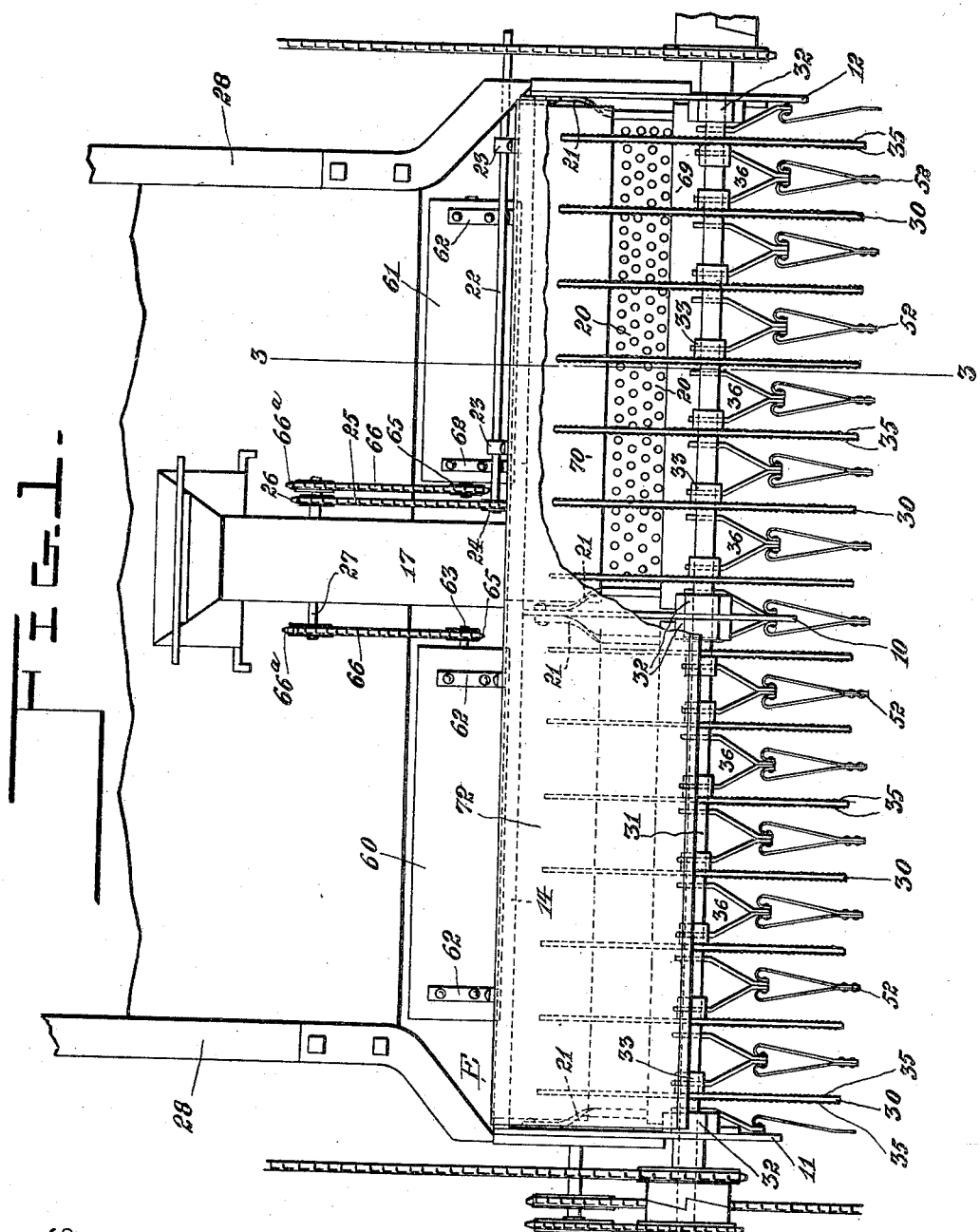
Witnesses:
William Maloney, Inventor
By Marion Marion
Attorneys No. 696,460. Patented Apr. 1, 1902.
W. MALONEY.
GRAIN THRESHING MECHANISM.
(Application filed Apr. 15, 1901.)
(No Model.) 4 Sheets—Sheet 2.
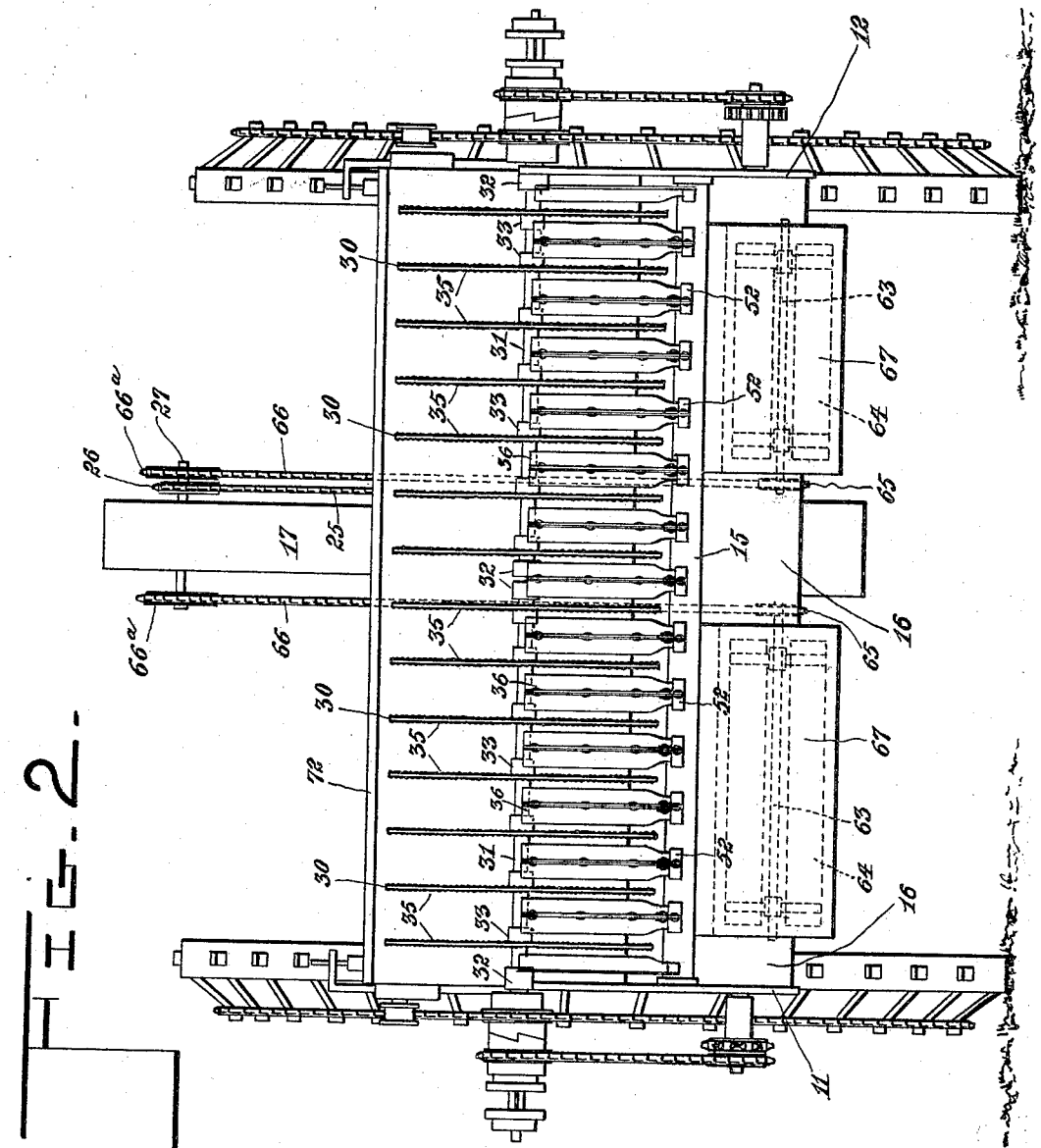
Witnesses:
William Maloney,
Inventor
By Marion & Marion
Attorneys No. 696,460. Patented Apr. 1, 1902.
W. MALONEY.
GRAIN THRESHING MECHANISM.
(Application filed Apr. 15, 1901.)
(No Model.) 4 Sheets—Sheet 3.
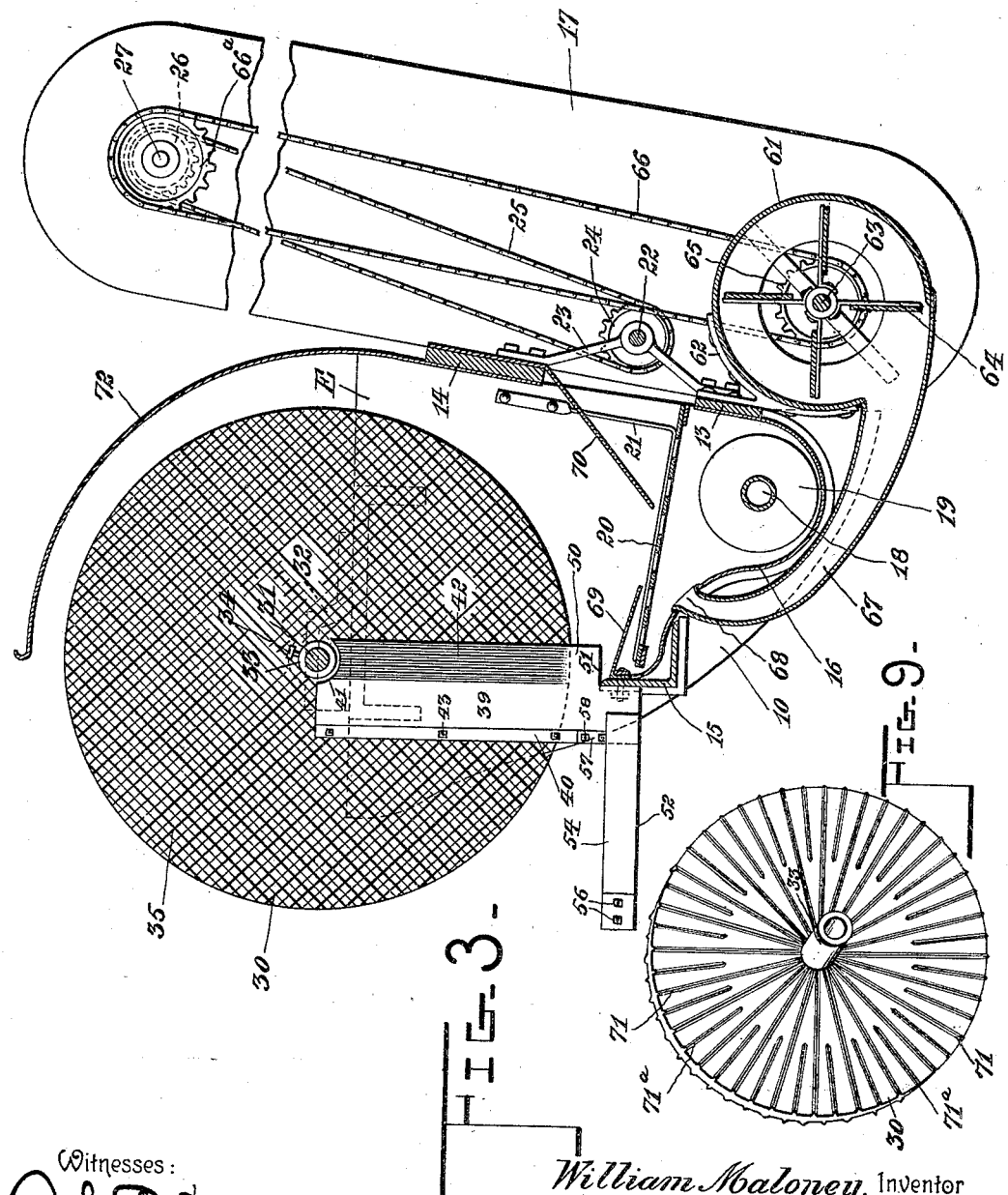
Witnesses:
William Maloney, Inventor
By Marion & Marion
Attorneys

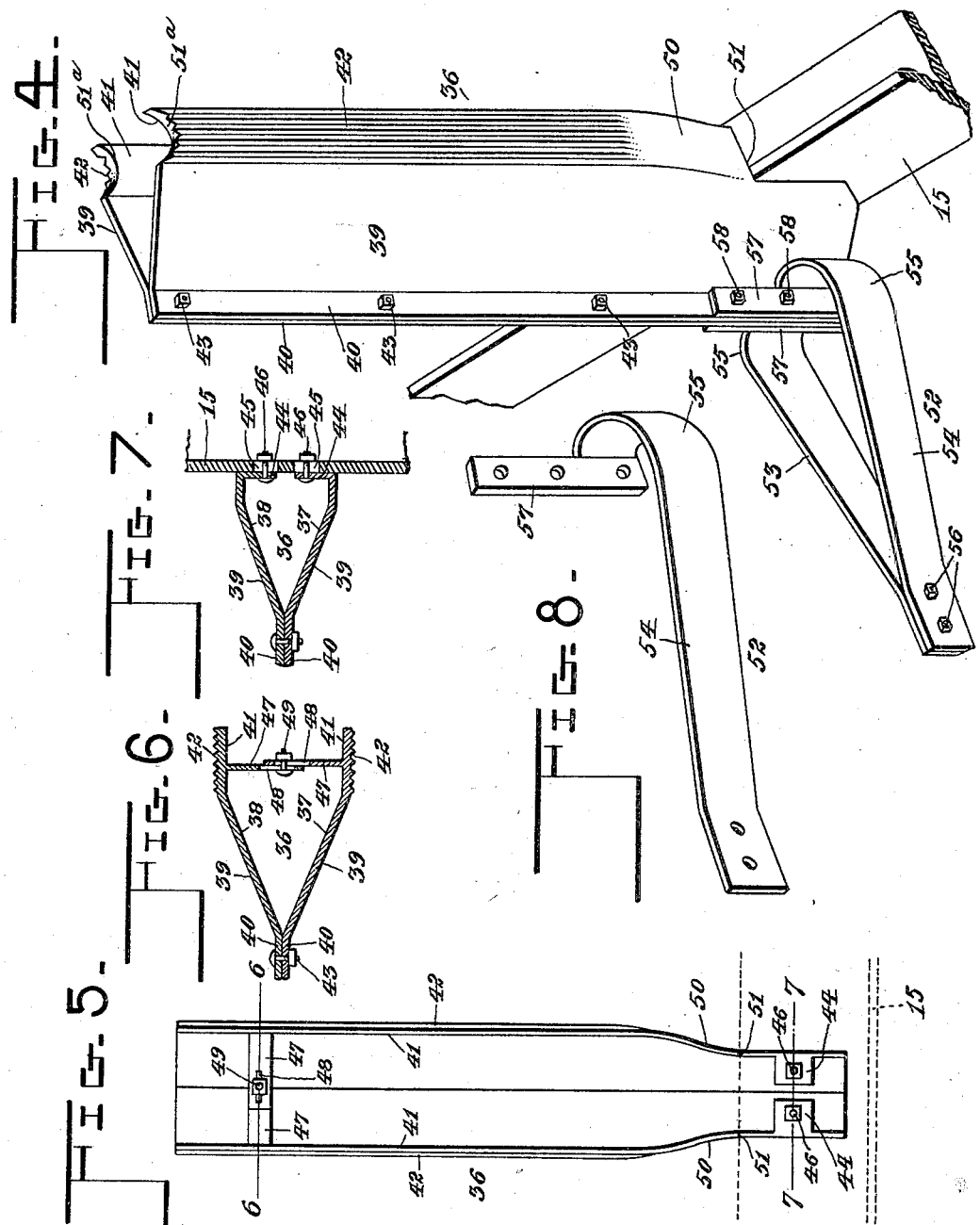

UNITED STATES PATENT OFFICE.

WILLIAM MALONEY, OF SHERBROOKE, CANADA, ASSIGNOR OF SEVEN-TENTHS TO MAXWELL S. INGLIS AND ISAAC PITBLADO, OF WINNIPEG, MANITOBA, CANADA, AND LOUIS T. WATSON, OF MINNEAPOLIS, MINNESOTA.

GRAIN-THRESHING MECHANISM.

SPECIFICATION forming part of Letters Patent No. 696,460, dated April 1, 1902.

Application filed April 15, 1901. Serial No. 55,833. (No model.)

*To all whom it may concern:*

Be it known that I, WILLIAM MALONEY, a subject of the King of Great Britain, residing at Sherbrooke, county of Sherbrooke, Province of Quebec, Canada, have invented certain new and useful Improvements in Grain-Threshing Mechanisms; and I do hereby declare that the following is a full, clear, and exact description of the invention, such as will enable others skilled in the art to which it appertains to make and use the same.

My invention is an improvement in grain-threshing mechanisms, the same being more especially adapted for traveling harvesters which are designed to harvest and thresh at one operation the kernels of grain from the standing stalks.

The object of the present improvement is the provision of a simple threshing mechanism which will thresh the grain-kernels from the heads of standing stalks without choking the mechanism by the stalks and without "throwing" the grain-kernels—that is to say, the kernels will be gathered or collected in and by the machine instead of being thrown into the air by the rotary action of the threshing-cylinder.

A further object of the invention is to provide means for disentangling the crossed or entangled stalks and heads and for dividing or separating the same, to the end that the stalks will be fed to the threshing-surfaces in a straight condition, which is calculated to secure maximum efficiency in the threshing operation.

Further objects of the invention are to make provision for the easy assemblage of the parts and for their adjustment and replacement according to the demands of the service, to subject the threshed grain to a blast of air delivered in a direction intended to blow the straws and chaff away from the grain, and to prevent the air-blast from blowing the grain back into the path of the threshing devices.

With these ends in view the invention consists in the novel combination, construction, and arrangement of parts, which will be hereinafter fully described and claimed.

In the drawings hereto annexed, forming a part of this specification, Figure 1 is a plan view of a threshing mechanism embodying my improvements. Fig. 2 is a front elevation thereof. Fig. 3 is a vertical transverse section through the threshing mechanism, taken in the plane of the dotted line 3 3 on Fig. 1. Fig. 4 is an enlarged perspective view of one of the threshing bars or plates and the divider which is associated therewith. Fig. 5 is a rear elevation of the parts shown by Fig. 4. Fig. 6 is a transverse horizontal section in the plane of the dotted line 6 6 on Fig. 5. Fig. 7 is a similar horizontal section in the plane of the dotted line 7 7 on Fig. 5. Fig. 8 is an enlarged detail perspective view of one part of a sectional divider. Fig. 9 is an elevation of a modified form of a cylinder-disk, illustrating the working surface thereof.

The same numerals and letters of reference denote like and corresponding parts in each of the several figures of the drawings.

The casing E for the threshing mechanism of my present invention is somewhat similar to a threshing-mechanism casing disclosed by a prior application filed by Messrs. Maloney, Dore, and Dore, dated July 10, 1900, Serial No. 23,113. This casing consists of the middle and two end plates 10 11 12, the back bars 13 14, the front angle-bar 15, and the curved metallic bottom 16, all these parts being suitably united together in any substantial way and the whole casing being mounted upon a suitable framework, the side bars of which are indicated by the numeral 28. This casing has an elevator-boot 17 associated therewith, and in the lower portion of the casing is journaled the shaft 18 of the screw conveyers 19. Over each conveyer is arranged a shaking-riddle 20, hung by suitable hangers, one of which is indicated at 21. On the rear side of the casing is the counter-shaft 22, which is journaled in suitable brackets 23, attached to suitable parts of the machine-frame—as, for example, the back bars 13 14—and around a sprocket 24 on this counter-shaft is the endless sprocket-chain 25, which engages with a sprocket 26 on the elevator driving-shaft 27.

The parts heretofore described (except the location and means for mounting the countershaft 22) are similar to devices disclosed by the prior application, to which reference has been made, and I do not consider it necessary to more particularly illustrate or describe said parts.

The threshing mechanism of my invention is intended to be mounted or supported at the front portion of a grain-harvester designed to travel or to be propelled across a grain-field, said threshing mechanism having its operating parts constructed so as to thresh the grain directly from the standing stalks, thereby harvesting and threshing the grain at one single operation.

The improved threshing mechanism of the present invention is constructed for operation on principles which I believe to be entirely novel in this art from the fact that it embodies a series of essentially upright elements supported in stationary positions for engagement directly by the heads of the standing stalks, and with these upright stationary elements are associated a corresponding series of revoluble elements having their working faces in vertical planes and in opposing relation to corresponding faces on the stationary elements, whereby the standing grain is received between the coacting faces of the stationary and revoluble elements on the advancement of the machine, so as to have the heads of the grain subjected to the rubbing action of the threshing elements.

I will now proceed to describe the preferred embodiment of a threshing mechanism operating on the principle hereinbefore outlined.

The revoluble elements which constitute the threshing-cylinder are in the form of a series of disks 30, arranged in parallel equidistant relation on a horizontal cylinder-shaft 31, the latter finding its support in the shaft-bearings 32 on the end plates 11 12 of the casing E. Each disk of the series is made fast with the shaft in any approved way, as, for example, by forming the disk with a hub 33, which is furnished with a binding-screw 34, adapted to impinge the shaft. Furthermore, each cylinder-disk has the lateral or side faces thereof provided with corrugations, ribs, or any other form of roughening adapted to form the working surfaces 35. In Fig. 3 of the drawings the working surface on each side of the disk is formed by intersecting series of ribs or projections; but the particular form or arrangement of these corrugations is not material, because I am aware that the long and short ribs 71 71ᵃ (shown by Fig. 9) may be employed in order to produce the working surface on the disk.

The stationary elements of the threshing mechanism are embodied in the form of a series of threshing bars or plates 36, the same being essentially disposed in upright positions and in alternate relation to the revoluble cylinder members 30, as clearly represented by Figs. 1 and 2, and with each threshing bar or plate is combined or associated one of a series of dividers 52, the same arranged in substantially horizontal positions and below the plane of action of the revoluble threshing-cylinder, each divider projecting in advance of the threshing bar or plate and serving to separate or divide the entangled or twisted stalks of grain, which are to be subjected to the action of my improved threshing mechanism.

In Figs. 4 to 7, inclusive, of the drawings I have shown a particular construction of the threshing bar or plate, the same comprising the two complemental members 37 38, each of which is cast in a single piece of metal. Each member of said threshing bar or plate has an inclined portion 39, a straight flange 40, and a straight threshing-section 41. The threshing-sections 41 of the two complemental members forming the bar or plate are formed with ribs or corrugations of any suitable character, so as to produce the working surfaces 42, such surfaces being at the rear portion of the threshing bar or plate and in opposing relation to the corresponding surfaces of two of the disks of the cylinder. Said complemental members are disposed in parallel relation to bring the flanges 40 in overlapping relation in order that these parts may be united firmly together by tranverse fasteners, as at 43, whereby the threshing-bar has the wedge-shaped form in cross-section represented by Figs. 6 and 7, which wedge-shaped form of the plate is produced by the inclined portions 39, which diverge laterally from the narrow ridge or crest at the front edge of the threshing-bar and formed by the lapped and united flanges 40. At its lower rear corner each threshing bar or plate is provided with a notch 51, which is adapted to receive the angle-iron 15, whereby the threshing-bar is adapted to be seated upon said angle-iron and to extend upwardly therefrom, as shown by Fig. 3. The members of each threshing bar or plate are provided with the inwardly-extending lugs 44, which lie between said members, at the lower portion thereof, (see Fig. 7,) said lugs being arranged to overlap the vertical wedge of the angle-iron, which is slotted, as at 45, for the reception of the fastening-bolts 46, whereby the threshing-bar is seated upon and secured firmly to said angle-iron 15. The upper portions of the threshing-bar members are stayed together by the inwardly-extending arms 47, which overlap one another and are provided with slots 48 for the reception of the bolts 49, whereby the arms may be adjustably clamped together, so as to spread or contract the rear portions of the members which have the threshing-surfaces. The threshing-sections 41 of the complemental members forming each threshing bar or plate are curved inwardly at the inner portion thereof, as at 50, and when the series of vertical bars or plates are properly assembled with relation to the disks of the threshing-cylinder it will be found that the threshing-sections 41 of the bars or plates are in parallel opposing relation to the surfaces of the disks, while the curved portions 50 in said threshing-sections are inclined inwardly and away from said working faces of the disks, so as to produce enlarged throats just above the angle-iron 15, which throats secure the necessary clearance for the threshed heads of the standing stalks. The series of vertical stationary threshing bars or plates extend upwardly from the angle-iron to a suitable distance with relation to the cylinder-shaft. Preferably the upper end of each bar or plate 36 has the transverse notches 51$^a$, by which the bar or plate is made to occupy a compact relation to the cylinder-shaft. (See Fig. 3.)

Each divider 52 is arranged in a substantially horizontal position below the path of the cylinder-disks and extending well forward beyond the crest of the threshing bar or plate. I prefer to make each divider in two parts, which are indicated by the numerals 53 54 and are provided with the curved or bulged portions 55. The front ends of the divider members are lapped and united together, as at 56, and said members have the plates 57 at their rear ends, which plates overlap the crest 40 of the threshing plate or bar and are united thereto, as at 58. Each divider is thus mounted upon the lower portion of one vertical threshing bar or plate, so as to have its curved faces 55 project laterally from the ridge or crest of the bar or plates and to lie in front of the inclined portions 39 of said threshing-plate. The grain, which may lie in tangled masses in the path of the series of dividers and the threshing-bars, is adapted to be first engaged by the dividers, which run through the tangled standing stalks or heads thereof for the purpose of spreading the same before said heads or the upper portions of the stalks are drawn into the spaces between the alternating stationary bars and the revoluble cylinder-disks, whereby the grain-heads are loosened or spread and properly directed to the working faces 42 of the stationary threshing members.

My threshing mechanism also contemplates the employment of one or more blowers arranged to deliver a blast of air upon the threshed grain and to blow the chaff and straws therefrom rearwardly from the machine. The fan-casings 60 61 are arranged in horizontal positions directly in rear of the screw conveyers of the threshing-mechanism casing, and these fan-casings are disposed on opposite sides of the elevator-boot 17 and supported by means of the brackets 62, which are fixed to the bar 13. Each fan-casing is provided with means for supporting a fan-shaft 63, which carries a fan 64 of any suitable construction, each fan-shaft being provided at one end with a sprocket 65, which is engaged by a sprocket-chain 66, the latter being driven from a sprocket 66$^a$ on the elevator driving-shaft 27, whereby the fans are driven from the elevator, although any other suitable means may be adopted for the operation of the fans. From each fan-casing leads a wind-trunk 67, the length of which is practically coextensive with that of the casing, said wind-trunk being curved beneath the bottom 16 of the casing E and terminating in a blast opening or port 68, arranged to direct the blast of air in a forward and rearward direction through the riddle 20. (See Fig. 3.) A blast-plate 69 is attached to the vertical web of the angle-iron 15 and extends rearwardly therefrom over the riddle 20 and the blast opening or port 68, whereby the blast is directed toward the rear of the threshing mechanism, so that it will not blow the inflowing grain in advance of the cylinder and the vertical bars of the threshing mechanism. A deflector-plate 70 is attached to the bar 14 and inclined downwardly with respect to the riddle 20. A curved hood 72 is also attached to this bar 14 and extends upwardly and forwardly over the cylinder.

On moving the machine across the field the dividers pass through the straight and tangled stalks, so as to separate or spread the same, and thereby the heads of the grain are properly arranged so as to pass into the narrow spaces between the threshing bars or plates and the revoluble disks of the cylinder. The rotation of these disks so as to move their working faces past the working faces of the threshing bars or plates subjects the grain-heads to a threshing action which is sufficient to thoroughly remove the kernels of grain from the heads. This threshing action is continuous, because the disks rotate at all times with relation to the stationary threshing-bars, and the grain-kernels are swept by the action of the cylinder past the threshing-bars, whereby the grain lodges upon the riddle. The grain-kernels pass through the riddle and are delivered by the conveyers to the elevator-boot, while the chaff and straws are blown by the blast beneath the deflecting-plates and through the rear portion of the threshing mechanism.

In addition to the continuous action of the threshing mechanism the latter is advantageous, because it will operate with efficiency on standing grain of different heights. It is evident that the disks will draw in the grain, which may stand from the top to the bottom of the threshing-plates, and as these disks extend for a considerable distance above the shaft the grain-heads of any stalks which may lie above the horizontal plane of the shaft are drawn by the rotary action of the disks in a downward direction below the shaft and subjected to the action of the working faces on the bars or plates.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. In a combined harvester and thresher adapted to advance through standing grain, a threshing mechanism mounted on the machine-frame in an exposed position and comprising a series of upright threshing-bars having the working faces exposed to access directly by the heads of the standing grain, and a series of revoluble elements operatively related to said working faces of the threshing-bars, the diameter of said revoluble elements exceeding the width of the threshing-bars, whereby the revoluble elements project well in front of the threshing-bars and are adapted to sweep or carry the heads of standing grain between the bars, substantially as described.

2. In a combined harvester and thresher adapted to advance through standing grain, a threshing mechanism mounted on the machine-frame in an exposed position and comprising a series of upright bars disposed in spaced relation and each having working faces in opposing relation to similar faces on other bars and said faces exposed to access directly by the heads of standing grain, and a series of revoluble disks each having working faces in opposing relation to similar faces on the adjacent bars, the diameter of said disks exceeding the width of the bars, whereby the disks project beyond the bars and are adapted to sweep or carry the heads of grain between the coöperative working faces, substantially as described.

3. In a combined harvester and thresher adapted to advance through standing grain, a threshing mechanism mounted on the machine-frame in an exposed position and comprising a series of revoluble disks provided with lateral working faces, and a series of upright bars having the working faces thereof exposed to access directly by the heads of standing grain and in coöperative relation to the similar faces on the revoluble disks, said threshing-bars being adjustable laterally and in parallel relation to an adjacent disk, whereby the width of the grain throat or space between the bars and disks may be increased or diminished, substantially as described.

4. In a combined harvester and thresher adapted to advance through standing grain, a threshing mechanism mounted on the machine-frame in an exposed position and comprising a series of revoluble disks provided with lateral working faces, and a series of upright bars having working faces in opposing relation to the similar faces of the disks, the diameter of each disk exceeding the width of the bar adjacent thereto, each upright bar having forwardly-converging guide-faces disposed in front of the working faces thereof and forming a narrow crest at the front edge of said bar, substantially as described.

5. In a combined harvester and thresher adapted to advance through standing grain, a threshing mechanism mounted on the machine-frame in an exposed position and comprising a series of revoluble disks provided with working faces, and a series of threshing-bars alternating with the disks and provided with working faces in opposing relation to the disks and exposed to access directly to the heads of standing grain, each threshing-bar consisting of complemental members provided with rearwardly-diverging grain-directing surfaces which extend from a narrow crest on the bar substantially to the working faces thereof, as set forth.

6. In a combined harvester and thresher adapted to advance through standing grain, a threshing mechanism mounted on the machine-frame in an exposed position and comprising a series of revoluble disks provided with working surfaces, and a series of upright bars having working faces in opposing relation to the disks and adapted to direct access by the heads of standing grain, the diameter of the disks exceeding the width of the bars, each bar consisting of complemental members provided with forwardly-converging grain-deflecting surfaces and said members being adjustable laterally with respect one to the other and to the working faces of the disks, substantially as described.

7. A threshing mechanism comprising a series of revoluble disks having the working faces, and a series of threshing-plates alternating with the disks, each threshing-plate consisting of members which are seated upon a suitable support and are connected adjustably thereto and stayed adjustably with relation to each other, said plate members having working surfaces at the rear portions thereof and in opposing relation to the working faces of the disk, substantially as described.

8. A threshing mechanism comprising a series of revoluble disks, a series of stationary threshing elements, and dividers extending in front of said stationary elements and having lateral bulged portions in operative relation to said elements, substantially as described.

9. A threshing mechanism comprising a series of revoluble elements, a series of upright elements in coöperative relation to the revoluble elements, and a series of dividers mounted upon the upright elements and projecting in advance thereof, each divider consisting of curved members united at their front ends and attached at their rear ends to the element, substantially as described.

10. In a combined harvester and thresher adapted to advance through standing grain, the combination of a shaking-riddle, a series of exposed upstanding threshing-plates disposed in advance of the riddle and having working faces exposed to access directly by the heads of standing grain, a series of exposed revoluble disks having working faces in opposing relation to the similar faces of said bars and revoluble in a direction to sweep grain between the bars and over the riddle, and a blast mechanism arranged to direct a blast rearwardly across the riddle, substantially as described.

11. In a combined harvester and thresher adapted to advance through standing grain, the combination of a shaking-riddle, upstanding exposed threshing-bars in advance of the riddle, revoluble disks between said threshing-bars and revoluble in a direction to sweep the heads of standing grain between the bars and to carry the grain over the riddle, a forwardly and downwardly inclined blast-plate at the rear portion of the riddle, and a blast-fan having its wind-trunk arranged to discharge a blast upwardly and rearwardly through the riddle, substantially as described.

12. In a combined harvester and thresher adapted to advance through standing grain, the combination of a casing having a curved bottom forming a conveyer-housing, a carrying-bar at the front edge of the casing, a shaking-riddle arranged within said casing, a series of exposed threshing-bars erected on said carrying-bar and disposed in advance of the riddle, revoluble disks in coöperative relation to said threshing-bars and arranged to sweep grain between the bars and over the riddle, a blast mechanism delivering a wind-current across the riddle, and a conveyer operatively disposed in said housing below the riddle, substantially as described.

13. In a combined harvester and thresher adapted to advance through standing grain, the combination of a casing provided at its rear side with a chaff-escape opening, a shaking-riddle supported in said casing contiguous to said opening therein, a series of exposed threshing-bars erected at the front edge of the casing and in advance of the riddle, a like series of exposed disks revoluble in a direction to sweep grain between the bars and over the riddle, a blast-fan, and a wind-trunk arranged to discharge a current of air in an upward and rearward direction through the riddle and toward the chaff-escape opening, substantially as described.

14. In a combined harvester and thresher adapted to advance through standing grain, a threshing mechanism mounted on the machine-frame in a position exposed to access directly by the heads of standing grain and comprising a series of threshing-bars provided with opposing working faces, each bar having at its base a deflected or curved portion arranged in coöperative relation to a similar portion on an adjacent bar and forming an enlarged clearance space or throat for the discharge of threshed grain, and exposed revoluble disks arranged to sweep grain between the threshing-bars and to coöperate with the latter in threshing the grain, substantially as described.

15. In a combined harvester and thresher adapted to advance through standing grain, a threshing mechanism mounted on the machine-frame in a position exposed to access directly by the heads of standing grain and comprising a series of threshing-bars and a series of revoluble disks in coöperative relation to the threshing-bars, each threshing-bar comprising a pair of complemental members disposed back to back and having the forwardly-converging grain-deflecting surfaces, substantially as described.

16. In a combined harvester and thresher adapted to advance through standing grain, an exposed threshing-bar comprising complemental members having the forwardly-converging grain-deflecting surfaces meeting in a central ridge or crest, working faces on the exposed surfaces of the members, and means for adjustably connecting the members, combined with revoluble disks disposed in coöperative relation to a series of such threshing-bars, substantially as described.

17. In a combined harvester and thresher adapted to advance through standing grain, the combination of a carrying-bar, a series of upstanding threshing-bars each having complemental members disposed back to back and said members fastened adjustably to said carrying-bar, said members of each threshing-bar having the exposed working faces and the grain-deflecting faces, means for rigidly and adjustably connecting the members of each threshing-bar together, and revoluble disks in coöperative relation to the threshing-bars, substantially as described.

In witness whereof I have hereunto set my hand in the presence of two witnesses.

WILLIAM MALONEY.

Witnesses:
JOHN F. DEUFFERWIEL,
J. A. MARION.